(12) United States Patent
Evanitsky

(10) Patent No.: US 7,860,735 B2
(45) Date of Patent: Dec. 28, 2010

(54) ONLINE LIFE INSURANCE DOCUMENT MANAGEMENT SERVICE

(75) Inventor: Eugene S. Evanitsky, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 297 days.

(21) Appl. No.: 12/107,418

(22) Filed: Apr. 22, 2008

(65) Prior Publication Data

US 2009/0265191 A1    Oct. 22, 2009

(51) Int. Cl.
 *G06Q 40/00* (2006.01)
(52) U.S. Cl. .............................................. 705/4
(58) Field of Classification Search ............ 705/4
 See application file for complete search history.

(56) References Cited

U.S. PATENT DOCUMENTS

| | | | |
|---|---|---|---|
| 7,149,347 B1* | 12/2006 | Wnek | 382/159 |
| 7,561,734 B1* | 7/2009 | Wnek | 382/159 |
| 7,698,159 B2* | 4/2010 | Metzger et al. | 705/4 |
| 2005/0134935 A1* | 6/2005 | Schmidtler et al. | 358/448 |
| 2005/0209892 A1* | 9/2005 | Miller | 705/4 |
| 2005/0210047 A1* | 9/2005 | Hayes et al. | 707/100 |
| 2006/0282442 A1* | 12/2006 | Lennon et al. | 707/100 |
| 2007/0013967 A1* | 1/2007 | Ebaugh et al. | 358/448 |
| 2007/0013968 A1* | 1/2007 | Ebaugh et al. | 358/448 |
| 2007/0118391 A1* | 5/2007 | Malaney et al. | 705/1 |
| 2007/0168382 A1* | 7/2007 | Tillberg et al. | 707/102 |
| 2007/0282824 A1* | 12/2007 | Ellingsworth | 707/5 |
| 2007/0299698 A1* | 12/2007 | Anandarao et al. | 705/4 |
| 2008/0068641 A1* | 3/2008 | Dance et al. | 358/1.15 |
| 2008/0147790 A1* | 6/2008 | Malaney et al. | 709/203 |
| 2008/0168135 A1* | 7/2008 | Redlich et al. | 709/204 |
| 2009/0182577 A1* | 7/2009 | Squilla et al. | 705/2 |
| 2009/0192828 A1* | 7/2009 | Yunker et al. | 705/4 |

\* cited by examiner

*Primary Examiner*—Jagdish N Patel
*Assistant Examiner*—Sara Chandler
(74) *Attorney, Agent, or Firm*—Carter, DeLuca, Farrell & Schmidt, LLP

(57) ABSTRACT

An online life insurance document management service includes a host server having a web-based interface adapted to facilitate secure customer access to the host server. The host server is configured to receive life insurance data communicated from the customer through use of a computing device. A processing module is in operative communication with the host server and is configured to process the life insurance data communicated from the customer. A processing software application is trained to classify the processed life insurance data and selectively extract data therefrom based on the classification. The processing software application is configured to selectively present the processed life insurance data for a customer verification via the web-based interface upon at least one of an unsuccessful classification and an unsuccessful extraction of data. A storage device is in operative communication with the processing module and is configured to store the extracted data as metadata upon at least one of the customer verification and the extraction of data. A content management software application is configured to detect at least one of a customer request and at least one triggering condition. The content management software application generates at least one report based on the detection of at least one of the customer request and the at least one triggering condition.

10 Claims, 3 Drawing Sheets

ONLINE LIFE INSURANCE DOCUMENT MANAGEMENT SERVICE

BACKGROUND

1. Technical Field

The present disclosure relates to an online data processing service, and, in particular, to a system and method for providing an online management service for life insurance documents.

2. Description of Related Art

Managing personal documents can be a difficult task for anyone. Life insurance policies, for example, often include extensive documentation including summaries of coverage conditions and amounts, information related to designated beneficiaries, as well as insurer contact information. Often, policy documents are kept in a box, dresser drawer, file cabinet, or some other unsecured location. Additionally, many policy holders are unaware of what coverage they have due to the high amount of insurance products offered in the market place or due to circumstances beyond their control (e.g., life insurance policies may be bought when the policy holder was a child, insurance companies change ownership, policy numbers change, contact names and phone numbers change, etc.). Also, life insurance coverage may come from unexpected sources such as, for example, banks and/or credit card companies that offer free life insurance coverage but never provide the insured with actual policy documentation.

Many policy holders prefer that, upon their death, designated beneficiaries and/or surviving family not be burdened with having to sort through policy documentation to discover how to collect a benefit. Thus, organizing and safekeeping of such documents is important not only for the policy holder, but for the family and beneficiaries surviving the policy holder.

SUMMARY

In an embodiment of the present disclosure, an online life insurance document management service includes a host server having a web-based interface adapted to facilitate secure customer access to the host server. The host server is configured to receive life insurance data communicated from the customer through use of a computing device. A processing module is in operative communication with the host server and is configured to process the life insurance data communicated from the customer. A processing software application is trained to classify the processed life insurance data and selectively extract data therefrom based on the classification. The processing software application is configured to selectively present the processed life insurance data for a customer verification via the web-based interface upon at least one of an unsuccessful classification and an unsuccessful extraction of data. A storage device is in operative communication with the processing module and is configured to store the extracted data as metadata upon at least one of the customer verification and the extraction of data. A content management software application is configured to detect at least one of a customer request and at least one triggering condition. The content management software application generates at least one report based on the detection of at least one of the customer request and the at least one triggering condition.

According to another embodiment of the present disclosure, an online life insurance document management service includes a host server having a web-based interface adapted to facilitate access to the host server by a remote computing device, wherein the remote computing device is adapted to communicate information to the host server via a network. The service further includes an authentication module operably coupled to the host server. The authentication module is adapted to operate on the web-based interface to control access to the data management service utilizing at least one authentication mechanism. The service further includes a processing module operably coupled to the host server. The processing module is configured to process the information communicated from the remote computing device and selectively extract data from the processed information. A storage device is operably coupled to the processing module and is configured to store the extracted data as metadata corresponding to the information communicated from the remote computing device. The service further includes a data management application configured to continuously monitor the metadata stored on the storage device to detect at least one triggering condition. The data management application is further configured to generate at least one report based on the detection of the at least one triggering condition.

The present disclosure also provides for a method for providing an online life insurance management service. The method includes the initial steps of providing a host server having a web-based interface adapted to receive information communicated from a computing device and processing the information communicated from the computing device. The method further includes the steps of providing a storage device in operative communication with the host server and configured to store the processed information as metadata and generating at least one associated link via the web-based interface corresponding to the stored metadata. The method further includes the steps of continuously monitoring the stored metadata to detect at least one triggering condition and generating at least one report based on the detection of the at least one triggering condition.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
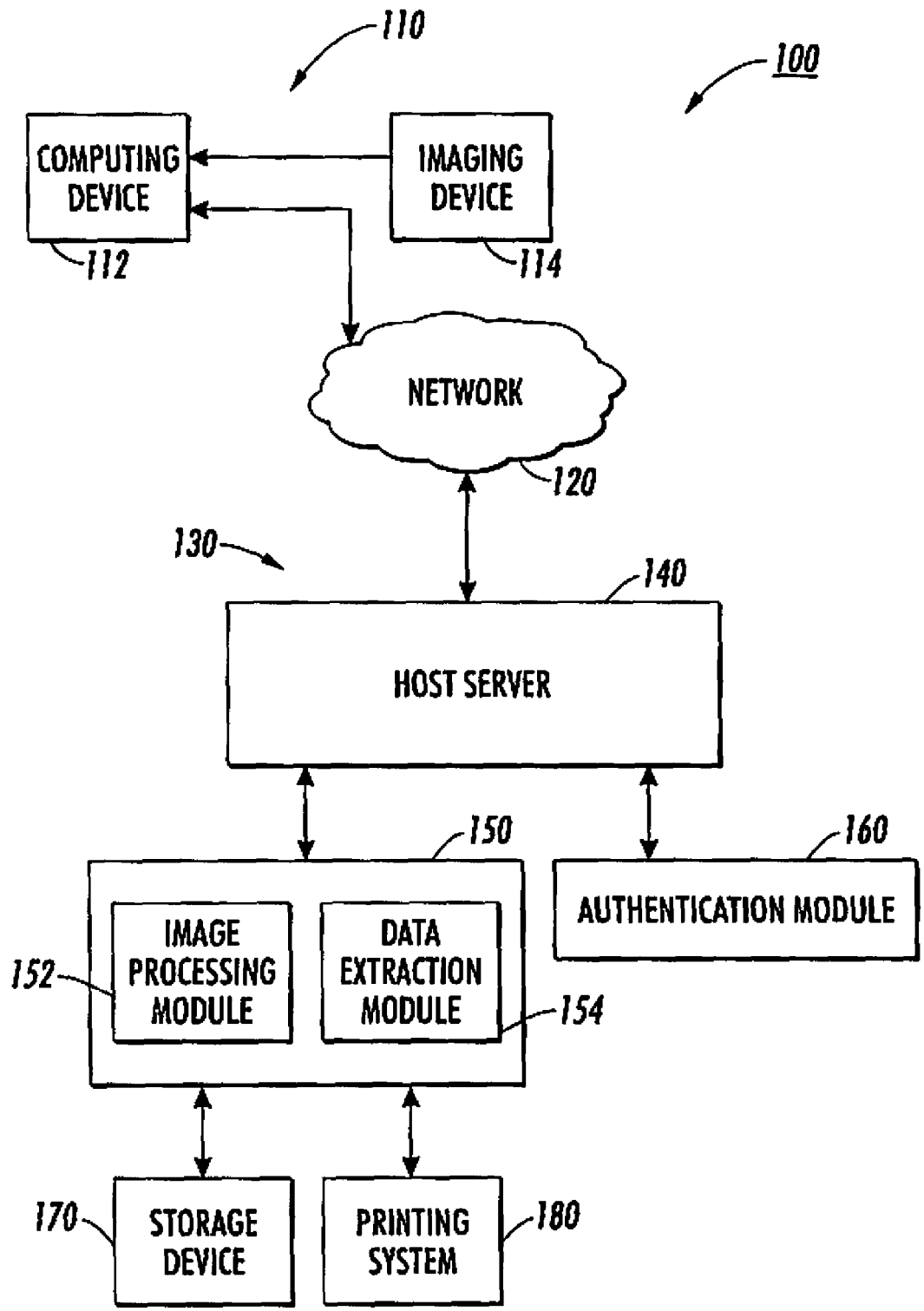
FIG. 1 is a block diagram of a data processing system in accordance with the present disclosure.

Embodiments of the presently disclosed advertisement system will now be described in detail with reference to the drawings in which like reference numerals designate identical or corresponding elements in each of the several views.

The present disclosure relates to an online data processing service, and, in particular, to a system and method for an online management service for personal documents related to life insurance. In an embodiment of the present disclosure, personal documents are stored and managed on a host system having a host server accessible by customers through use of a computing device (e.g., cell phone, computer, etc.). Customers accessing the host server are greeted by a web-based interface adapted to provide personal services. For example, personal services may be provided by Xerox® Corporation through a Xerox® Personal Services (XPS) website. More specifically, the personal services website or XPS website may employ a user interface (UI) adapted to enable the customer to utilize a service such as SaaS (Software-as-a-Service) to access and manage their life insurance documents. Saas is a software application delivery model where a software vendor develops a web-native software application and hosts and operates (either independently or through a third-party) the application for use by its customers over a network (e.g., the Internet). Customers do not pay for owning the software itself but rather for using the service. That is, the customers may pay a periodic subscription fee (e.g., monthly, annually, etc.) for the right to use the software over the Internet (e.g., through the UI). In other embodiments, the customer may pay a one-time or life-time fee to gain access to the service for life. That is, the one-time fee allows the customer to access and use the service until death or cancellation of subscription. In this scenario, the service may be offered at a discount relative to a pro-rated periodic fee structure in exchange for long-term loyalty to the service. In other embodiments, a usage fee may be charged for each document processed along with additional fees for storage and access. Upon expiration of the subscription and/or in the event the customer no longer wishes to subscribe to or use the service, the XPS may provide the customer with a DVD and/or a CD ROM having a complete archive of the customer's data stored thereon. Further, the XPS may provide the customer with a suitable software application that is adapted to extract the archived data from the DVD or CD ROM to the customer's computing device for viewing.

The XPS website may provide a variety of data management services including a life insurance management service. That is, paying customers may be provided access to multiple document services offered by the XPS through a single website or one or more related websites. The customer may be the policy holder or a third party user granted authorization from the policy holder to access the policy holder's personal data on the XPS website, as will be discussed below.

The customer may utilize an imaging device (e.g., a scanner) to capture images of documents and subsequently communicate the captured image data to a computing device. The computing device is adapted to upload (e.g., utilizing FTP, drag-and-drop, etc.) the captured image data as image files (e.g., digital image files) to the host server through use of the UI. Once uploaded, documents are processed by the host system and presented to the customer to enable a quality assurance check, as will be discussed in further detail below. It should be appreciated that the customer may also upload captured image data from a hand-held computing device (e.g., cell phone, PDA, etc.) to the host server directly. For example, the customer may utilize a web-enabled cell phone camera to capture an image of a life insurance document and access the host server directly to upload the captured image data. The customer may further input life insurance information that may not be adapted for imaging and/or scanning (e.g., credit card accounts with life insurance protection, bank accounts providing term life insurance, memberships with insurance benefits, etc.) through use of the UI. For example, some credit card companies offer life insurance and accident insurance protection when certain purchases (e.g., travel tickets) are made using their credit card. Without the benefit of the novelties appreciated by the scope of the present disclosure, policy beneficiaries may have no way of knowing whether they are entitled to a benefit from this protection since the policy holder will already be deceased and, thus, unable to notify intended beneficiaries.

In embodiments, a variety of authentication mechanisms (e.g., username, password, etc.) may be employed to prevent unauthorized access to personal data on the XPS website. In this scenario, authenticating information such as, for example, a username and password is required to access the life insurance management service and/or the personal data of the policy holder. Further, the policy holder may grant authorization privileges to third parties (e.g., spouse, relatives, guardian, beneficiaries, etc.), which allows them to access the personal data of the policy holder. Once secure access to the life insurance management service is gained and the customer has uploaded the desired files to the host system, the files are processed by the host system and key data is extracted from the processed files and stored in a storage device (e.g., a database) as metadata in a user profile or folder designated for a given customer. In embodiments, the host system may, in addition to metadata, store images of the uploaded files as digital image files (e.g., JPG, GIF, PNG, TIF, etc.) or as PDF files in the storage device to provide archive protection. In this manner, the XPS may offer a guarantee that uploaded documents will not be altered once received and processed by the host system. That is, once documents are uploaded, processed, and stored by the host system, customers need not be concerned with misplacing or losing paper or so-called "hard copy" documents.

The SaaS may incorporate a content management software application adapted to monitor the stored metadata to detect one or more triggering conditions. The triggering condition may be any material change to the metadata such as, for example, policy expiration dates, coverage lapses, policy renewal dates, policy cancellations, payment due dates, policies changing hands between insurers, insurer ownership changes, etc. Material changes to the metadata may be tracked automatically and/or manually, as will be discussed in further detail below. Based on the detection of a triggering condition, the content management software application generates a report to the customer(s) regarding the triggering condition.

In embodiments, the content management software may generate a report to policy beneficiaries (e.g., surviving heirs) to inform such parties of the documentation needed to collect benefits triggered by the death of the policy holder. Other reports may be generated to beneficiaries depending on cause of death. For example, if the policy holder's death was accidental and a third party is liable to provide benefits (e.g., airline liable in the event of a plane crash), the beneficiaries may be informed as to how to collect such benefits.

The host system may employ a suitable processing software application having optical character recognition ("OCR") functionality to process uploaded files and extract key data therefrom for storage in the user profile of the customer. The processing software application is "trained" with sample sets of life insurance documents to enable identification and extraction of key data depending on the type or classification of document processed. In embodiments, file paths to specific metadata stored in the storage device may be graphically represented as an associated link (e.g., a hyperlink) on the XPS website. The customer selects the associated link to view information (e.g., metadata) stored in the user profile corresponding to any one or more life insurance policies. In this way, all associated links may be discovered by the customer through the UI and the metadata may be reviewed for accuracy. The customer can then make necessary changes to the user profile accordingly.

The service further utilizes the extracted data to automatically manage the life insurance policies of the user. More specifically, based on the extracted data the service provides notifications or reports related to policy coverage to the customer and, further, provides notifications to beneficiaries, survivors, and/or any party privileged to receive information related to a particular life insurance policy. Reports may be provided through a variety of methods, as will be discussed in further detail below. In this manner, the system of the present disclosure is configured to provide automatic management of life insurance policies during the policy holder's life as well as posthumously.

For each policy managed by the system for a given user profile, the corresponding metadata may include vital information such as, for example, the policy holder, beneficiaries of the policy, the amount or level of coverage, the terms of coverage (e.g., accidental death, double indemnity riders, term life vs. whole life, etc.), insurance company name and contact information, etc. Other vital information may be included and the above list should not be construed as exhaustive. The XPS website may include other associated links representing file paths to supplemental information input by the customer (e.g., credit card data, memberships with insurance benefits, etc.) and stored in the user profile of that customer. In embodiments, the UI may include search functionality to permit the customer to methodically search metadata and/or content stored in the user profile. That is, the customer may search and/or sort their policy information based on any one or more vital information parameters included in the metadata, as listed above.

Customer-selected preferences may be utilized to customize the XPS website experience for each customer individually. For example, customers may select report criteria, report recipients, and methods of communicating reports (e.g., email, snail mail, etc.) via the UI. Further, customers may selectively and/or automatically receive reports (e.g., updates, status reports, etc.) related to any one or more life insurance policies managed in the user-profile.

Reference is first made to FIG. 1, which shows system architecture of a data processing system 100 adapted to process, store, and manage documents in accordance with embodiments of the present disclosure.

Generally, data processing system 100 includes at least one computing device 110 and a host system 130. The host system 130 includes a host server 150 accessible by the computing device 110 via a network 120 (e.g., Internet, WAN, LAN, Bluetooth, etc.). The computing device 110 may be any known computing device (e.g., computer, hand-held computing device, cell phone, personal digital assistant (PDA), etc.) suitable to communicate data over a network (e.g., Internet, WAN, LAN, Bluetooth, etc.). In embodiments, the computing device 110 may include several components, including a processor, RAM, a hard disk drive, a USB interface, a network interface, a computer display/monitor, a computer mouse, a computer keyboard, and/or other components. Computing device 110 may also include software adapted to provide document management functionality and/or digital image management functionality.

In the illustrated embodiment, the computing device 110 is adapted to operably communicate with an imaging device 112 (e.g., a xerographic copy device, a camera, a scanner, a cellular phone, etc.). It will be appreciated that the imaging device 112 may utilize image capture technology to scan documents which are subsequently converted to digital image files (e.g., JPG, GIF, PNG, TIF, etc.) utilizing a suitable software driver installed on the computing device 110. In embodiments, the imaging device 114 is utilized to scan personal documents related to life insurance policies. That is, the customer accesses the host server 140 via the network 120 to upload the scanned image file thereto, as will be discussed in further detail below.

The host server 140 may be any suitable network device running any known operating system and configured to communicate data over the network 120. In other words, a computer, switch, router, gateway, network bridge, proxy device or other network device that is programmed or otherwise configured to operate as explained herein is considered an embodiment of this disclosure. It should be appreciated that any data communicated to or from the host server 140 may be encrypted by the service to ensure that customer information is kept private.

The host system 130 further includes a processing module 150 in operable communication with the host server 140. The processing module 150 includes an image processing module 152 adapted to process uploaded image files and an extraction module 154 adapted to extract data from the image files processed by the image processing module 152. In embodiments, the image processing module 152 employs an optical character recognition ("OCR") software application to process the uploaded image files. Several optical character recognition software applications are presently commercially available (e.g., Brainware, XRCE Categorizer, etc.). It should be appreciated that embodiments of the present disclosure are adapted to operate utilizing any OCR software application within the purview of one skilled in the art. Upon processing by the OCR, the processed image files are classified (e.g., by document type) by the extraction module 154 using a suitable processing software application. The processing software application may be the OCR itself or, alternatively, a separate software application. Based on the classification, the processing software application extracts key data from the classified document. Typically, software applications utilized to seek out data from unstructured or semi-structured documents require "training" with sample sets of unstructured data. This training enables the processing software application to recognize key data on a given document to classify the document (e.g., category of insurance document) and, based on this classification, seek out and extract key data therefrom. Typically, life insurance documents are semi-structured and include key words and information that the processing software application may be trained to detect and extract. The processing software application is "trained" with sample sets of life insurance documents and documents related thereto to enable the classification of documents and extraction of key data therefrom.

In embodiments, the service enables the customer to perform a quality assurance check of all documents processed by the system 100 prior to storage therein. For example, if the processing software application is unable to extract data from a document and/or classify the document with certainty, the customer is alerted through the UI. In response to this alert, the customer may utilize the UI to verify the classification of the document and/or the data from the document and, further, make corresponding modifications. Further, the system 100 is self-learning in that each successful classification and extraction related to a processed document enables the system 100 to accumulate a so-called "knowledge-base" of life insurance documents to complement the trained processing software application. In this way, the system 100 learns with each document processed, whether successfully or unsuccessfully and subsequently verified and/or modified. That is, once a document or document type has been verified and stored by the system 100, subsequent documents of the same or substantially similar type may not require verification by the customer thereafter.

The data extracted by the data extraction module 154 is stored in a storage device 170 in operative communication with the processing module 150. In embodiments, the storage device 150 may be a database or a plurality of databases in operative communication with the processing module 150. In other embodiments, the host server 140 may include one or more onboard databases.

In the illustrated embodiment, the host system 130 includes a printing system 180 in operative communication with the processing module 150. The printing system 140 may be, for example, one or more xerographic printing devices configured to retrieve print instructions from the service corresponding to a report and/or report request and, subsequently, print the report onto a substrate (e.g., printing paper, photo paper, etc.). Once printed, the report may be mailed to the intended recipient (e.g., by an XPS representative) and/or made available for pickup by the customer (e.g., at an XPS office location). For example, the report may be intended to alert the insured that a particular insurance policy's coverage has lapsed or expired. Alternatively, the report may be intended to alert a beneficiary that he or she is entitled to a benefit and further include information necessary for the beneficiary to collect that benefit. Other reports may include alerts related to changes in coverage, changes in insurance company ownership, status reports, updates, etc. Reports may be automatically generated and/or selectively generated by the customer via the UI.

In embodiments, the content management software application monitors the metadata stored in the storage device 170 for a triggering condition. The triggering condition may be any material change to the metadata stored in the storage device 170 (e.g., expiration dates, policy renewal dates, change in coverage, change in insurer ownership, etc.). Upon detection of the triggering condition, the content management software application causes the printing system 180 to print the appropriate report for mailing to the intended recipient. In this manner, customers may receive reports in a so-called "hard-copy" format from the host system 130.

In embodiments, reports may be sent from the host server 140 to the computing device 110 via a user-selected email address over the network 120. That is, the customer may utilize the UI to specify one or more email addresses at which to receive reports and/or related information and to select a link to cause such email to be sent. In this scenario, the service monitors the metadata stored in the storage device 170 for trigger conditions and generates an email report to the one or more customer-selected email addresses based on a detected trigger condition. In embodiments, reports and/or related information may be provided graphically on the UI of the XPS website at the request of the customer. In this manner, the customer may quickly and conveniently access the service (e.g., via cell phone, laptop, etc.) to retrieve information and/or documents therefrom. It should be appreciated that generating reports in email format does not preclude the service from generating additional reports in hard-copy format via the printing system 180.

Material changes to the metadata may be caused by updates to specific information in the metadata (e.g., change in coverage, change in insurer ownership, change in insurer contact information, etc.). In embodiments, the metadata stored in the storage device 170 may be updated and/or changed manually (e.g., by an XPS technician). For example, a host server administrator and/or an XPS technician may gather up-to-date information by contacting life insurance companies directly. In another embodiment, the host system 130 may automatically track up-to-date life insurance information via the Internet. For example, the SaaS may employ a suitable web application (e.g., web 2.0®, mashup applications, etc.) to provide the customer with updated information from multiple websites for that purpose. In this way, the service may be configured such that the life insurance data in the user profile of the customer is automatically updated over the Internet.

Use of the data processing system 100 according to embodiments of the present disclosure will now be discussed. Starting from the computing device 110, access to a secure web portal located on the host server 140 may be gained via the network 120 using security protocols such as, for example, secure sockets layer (SSL) or secure HTTP (S-HTTP). Secure access may be managed by the authentication module 160 employing a suitable authentication mechanism. That is, once a secure link is established, the authentication module 160 may prompt the customer to input a user name and password, account number, key words, a challenge-response test (e.g., CAPTCHA™), or other identifying information to facilitate access to the life insurance management service. Once access to the service is gained, the customer may interact with the UI to select an associated link to a particular management service such as, for example, the life insurance management service. Additional associated links may be provided for other document management services which may be offered by the XPS. Once a specific management service is selected, the customer may upload image files to the host server 140 related to that particular service (e.g., life insurance management service).

In embodiments, the customer may choose to receive a status report and/or update report pertaining to any one or more life insurance policies managed by the service for that particular customer. In this scenario, the service may provide, via the UI, report-generating links associated with each life insurance policy in the user profile that are configured to generate a status report (e.g., an update) for a specific life insurance policy. Additional links may be included that are configured to permit the customer to choose the format(s) in which the status report will be generated. For example, the customer may select the report-generating link to have the status report for a particular life insurance policy emailed to an email address of their choosing. Additionally or alternatively, the customer may choose to receive a status report in a hard-copy format wherein the host system 130 prints the status report via the printing system 180. Status reports may include information such as, for example, coverage scope for different causes of death (e.g., natural, accidental, terrorism, war, hospital error, etc.), effects of retirement on coverage, death benefit distributions to heirs, etc. In embodiments, the customer may additionally choose to have reports (e.g., notifications, updates, alerts, etc.) sent to third parties (e.g., beneficiaries).

In the illustrated embodiment, the data processing system 100 includes a single computing device 110 adapted to communicate with the host system 130. This configuration is illustrative only in that access to the host server 120 may be gained by any paying customer (e.g., as dictated by the authentication module 160) utilizing a suitable computing device.

Figure 2:
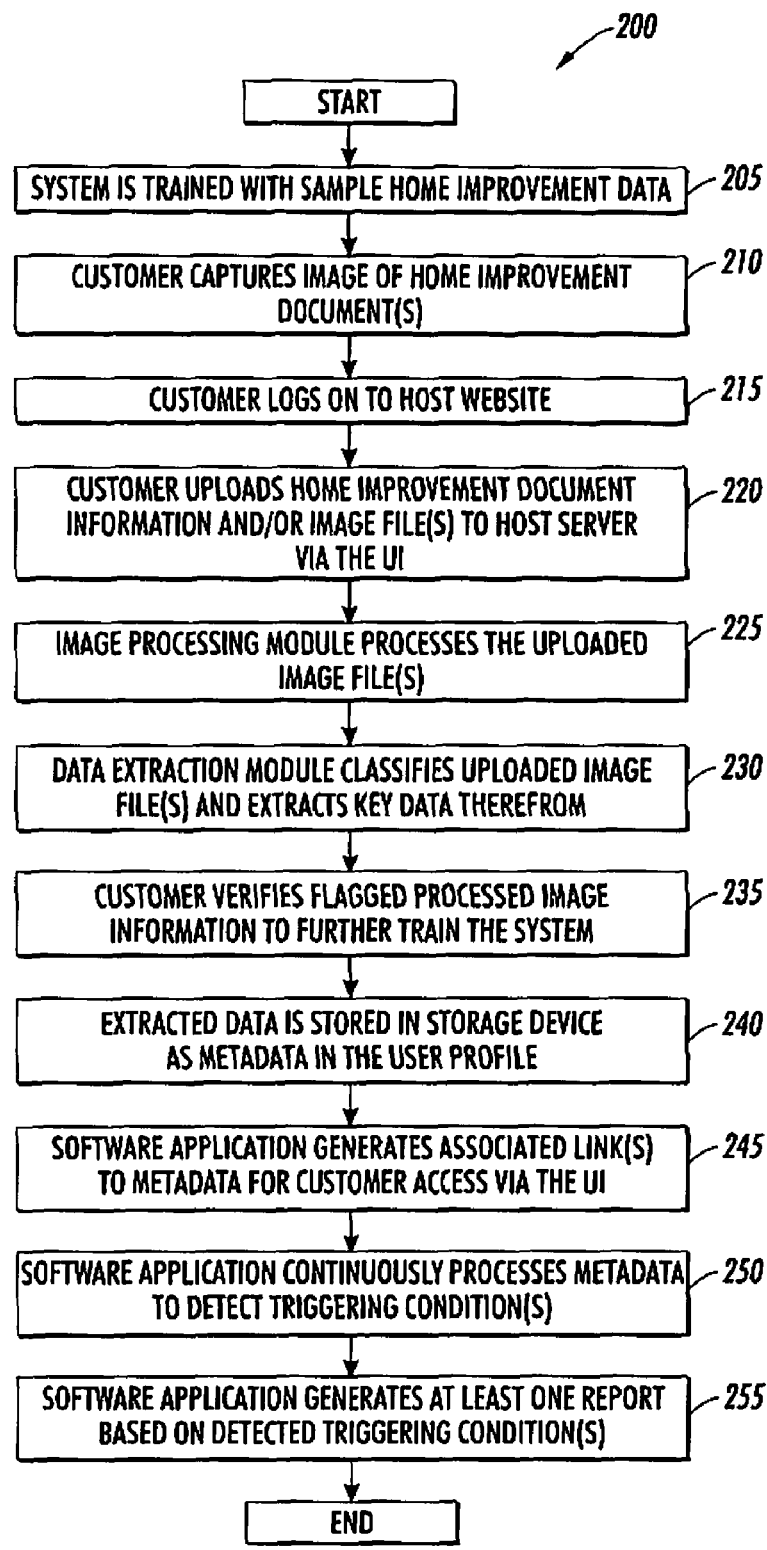
FIG. 2 is a flow chart diagram illustrating a method for providing an online management service for personal documents in accordance with one embodiment of the present disclosure.

FIG. 2 illustrates a method 200 for utilizing embodiments of the system disclosed herein. In step 210, the customer utilizes the imaging device 114 to scan the desired personal documents. The computing device 112 interfaces with the imaging device 114 to receive the scanned documents therefrom. The computing device 112 may be adapted to manage the scanned images as digital image files (e.g., via any suitable digital imaging software application). In step 220, the customer gains secure access to the host server 140 by logging on to the XPS website utilizing one or more authentication mechanisms (e.g., user name and password) managed by the authentication module 160. Once secure access to the host server 140 is gained, the customer accesses the desired management service (e.g., life insurance management service) and uploads the desired image file(s) from the computing device 112 to the host server 140 in step 230. In step 240, the processing module 150 executes the so-called "trained" OCR software application which, in turn, processes the image file(s) in step 240 and detects and extracts key data from the processed image file(s) in step 250. In step 260, the key data extracted in step 250 is stored in the storage device 170 as metadata in the user profile of the customer. In step 270, the SaaS software generates associated links on the XPS website that the customer may select to access the user profile and view metadata (e.g., processed image file(s), supplemental information, etc.) stored therein. In step 280, the SaaS monitors the metadata stored in the storage device 170 to detect a trigger condition and, in step 290, the service generates reports (e.g., via email and/or hard-copy) based on the detected trigger condition.

Figure 3:
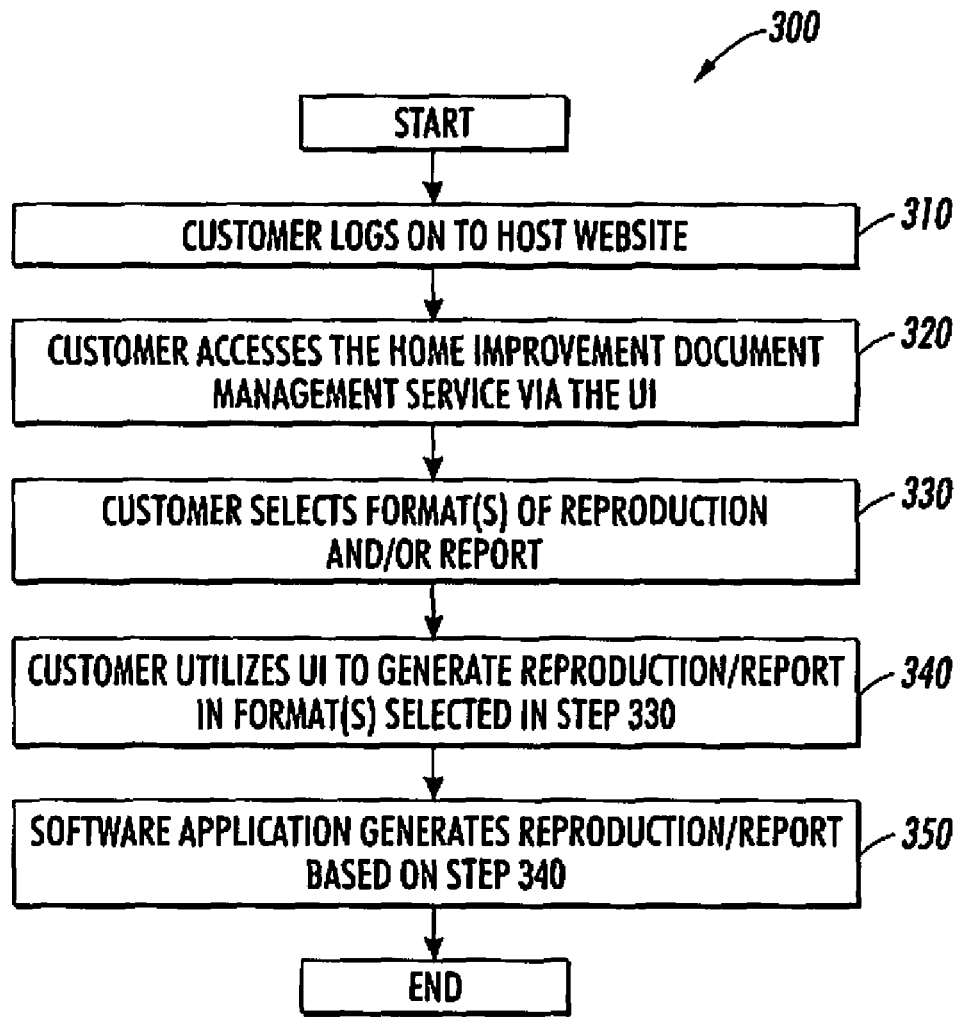
FIG. 3 is a flow chart diagram illustrating a method for providing an online management service for personal documents in accordance with another embodiment of the present disclosure.

FIG. 3 illustrates a method 300 for selectively generating a report according to embodiments of the present disclosure. In step 310, the customer gains secure access to the host server 140 by logging on to the XPS website utilizing one or more authentication mechanisms (e.g., user name and password) managed by the authentication module 160. Once secure access to the host server 140 is gained, the customer accesses the desired management service (e.g., life insurance management service) in step 320. Once the desired management service is accessed, the customer, in step 330, selects the format or formats (e.g., hard copy and/or email) in which the report is to be generated via the UI. In step 340, the customer utilizes the UI to generate the report in the format(s) selected in step 330. In step 350, the SaaS generates the report based on the customer selection in step 340.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An online life insurance document management service system comprising:
   a host server having a web-based interface configured to facilitate secure customer access to the host server, the host server configured to receive life insurance data communicated from the customer via the web-based interface through use of a computing device;
   a processor in operative communication with the host server and configured to process the life insurance data communicated from the customer;
   said processor having a processing software application, said processing software application when executed by the processor is configured to:
      classify the processed life insurance data;
      selectively extract data from the processed life insurance data based on the classification; and
      selectively present the processed life insurance data for a customer verification via the web-based interface upon at least one of an unsuccessful classification and an unsuccessful extraction of data;
   a storage device in operative communication with the processor and configured to store the extracted data as metadata upon at least one of the customer verification and the extraction of data; and
   said processor having a content management software application, said content management software application when executed by the processor is configured to:
      detect at least one triggering condition caused by a material change to the stored metadata; and
      generate at least one report corresponding to the stored metadata in response to request and the detection of the at least one triggering condition.

2. An online life insurance document management service system according to claim 1, further including a printing system in operative communication with the processing module and configured to print the at least one report generated by the content management software application.

3. An online life insurance document management service system according to claim 1, further including an authentication module in operative communication with the host server and configured to authenticate access to the host server through the web-based interface.

4. An online life insurance document management service system according to claim 1, further comprising a web-based software application configured to automatically retrieve updated life insurance information corresponding to the stored life insurance data.

5. An online life insurance document management service system according to claim 1, wherein the processing module employs an optical character recognition application to extract the data from the processed life insurance data.

6. An online life insurance document management service system according to claim 1, wherein the at least one report is at least one of an email and a printed hard-copy.

7. An online life insurance document management service system according to claim 1, wherein the processing software application is cumulatively trained to subsequently classify the processed life insurance data successfully upon the customer verification thereof.

8. An online life insurance document management service system according to claim 1, wherein the life insurance data stored in the storage device is configured to facilitate successful classification of life insurance documents corresponding thereto.

9. An online life insurance document management service system according to claim 1, wherein the content management software application is provided as a software-as-a-service application.

10. An online life insurance document management service system according to claim 1, wherein the processor is further configured to process a customer request for information corresponding to the stored metadata and received by the host server via the web-based interface, wherein the content management software application is configured to process the stored metadata and generate at least one report corresponding to the stored metadata in response to the processed customer request.

* * * * *